July 12, 1966 G. DORNBERGER 3,260,837

APPARATUS FOR MULTIPLYING AND DIVIDING SUCCESSIVELY OCCURRING FREQUENCIES

Filed March 19, 1962

INVENTOR
G. DORNBERGER
By A. J. Nugent
ATTORNEY

United States Patent Office 3,260,837

Patented July 12, 1966

3,260,837

APPARATUS FOR MULTIPLYING AND DIVIDING SUCCESSIVELY OCCURRING FREQUENCIES

Georg Dornberger, Union, N.J., assignor to Western Electric Company, Incorporated, New York, N.Y., a corporation of New York Filed Mar. 19, 1962, Ser. No. 180,624

8 Claims. (Cl. 235—92)

This invention relates to computers and particularly to computing apparatus for making calculations involving successively occurring factors.

A number of computing devices, such as electronic counters are commercially available for counting a frequency by computing the ratio of an input frequency to a standard frequency during a fixed time interval determined by a time base. A solution to the problem of readily performing multiplication or division calculations with frequencies which occur at successive time intervals is proposed in the related application of Georg Dornberger and Willian M. Smith, Serial Number 81,962, filed January 11, 1961, now Patent No. 3,213,361. No satisfactory arrangement presently exists for performing addition or subtraction operations although it is conceivable that successive counts could be made and then further calculations performed with computing apparatus to obtain the final result. These methods are obviously inadequate when applied to large scale production operations since it is desirable under such circumstances to make rapid precise measurements of relationships between parameters which can be equated to frequency. The subject of this application is a versatile, inexpensive device for solving equations involving multiplication or division. Certain addition or subtraction operations are performed which are ancillary to the multiplication and division. This device is particularly useful for computations in which the factors are measurements taken from an automated, continually running process and the solution is fed back to control the process.

An object of this invention is to provide a computer for calculations involving frequencies which occur at successive time intervals.

Another object is to provide apparatus in which the difference of two frequencies is stored and used as a multiplier for calculations involving a third frequency.

A further object is to provide apparatus capable of computations involving measurements taken from an automated continually running process where the solution is fed back to control the process.

A more specific object is to provide a computer controlling the production of insulated wire by automatically adjusting the dielectric constant of insulation.

In accordance with the general features of this invention, a computer adds or subtracts and multiplies or divides successive factors in terms of freqency. The computer includes a counter for measuring the frequency and an input for applying two signal frequencies successively. A memory or register is connected to the counter output for storing a count based on a signal frequency applied to the input. A matrix registers the stored frequency count and a conventional type unit provides a second input to the matrix resulting in an addition or subtraction operation. Means are provided to feed back the result to the counter to establish a new time base. A second signal frequency is then applied to the counter to perform a multiplication or division operation.

One example of the invention relates to control of insulated wire by adjusting the dielectric constant of insulation. A first voltage proportional to the insulation diameter is converted to a signal frequency and applied to the counter. A constant setting representative of the bare wire diameter is fed to a matrix where it is subtracted from the first frequency setting. A second voltage proportional to the coaxial capacitance of the insulated wire is converted to a signal frequency and fed as previously described to the counter with the new time base to solve a multiplication operation for the dielectric constant. The solution is then applied to control means for regulating the wire insulating process.

This invention provides a versatile inexpensive computer which can be adapted for any number of automatic process calculations in which the relationship of two or more successively measured factors must be determined for control purposes. Additionally the computer provides a means of controlling a process where the successively measured factors are continually varying and it is necessary to maintain a control over these deviations. Computations involving the dielectric constant of insulated wire illustrate but one of the numerous forms this invention may take and it is to be noted that the invention is not limited to a voltage measurement scheme but any satisfactory measurement indicative of capacity or diameter and related to frequency may be employed.

Other objects and advantages will be apparent when considered in conjunction with the accompanying drawings, wherein.

Figure 1:
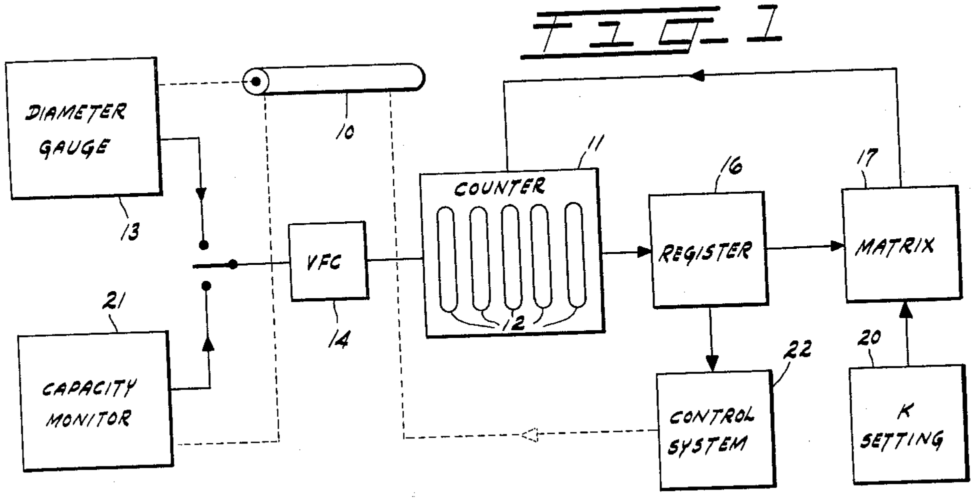
FIG. 1 is a schematic circuit diagram illustrating an embodiment of the invention for continually computing the dielectrc constant of insulated wire.

With respect to the drawings, it is to be understood that those portions of the circuit representing conventional and commercially available equipment known in the art will not be described in detail. As illustrated in the drawings, the counting apparatus includes a counter 11 which records and visually displays a frequency or period count. The counter is provided with a binary register section and a visually displayed decimal register section 12.

The diameter of the insulated wire 10 is measured with a diameter measuring gauge 13 and converted into D.C. voltage which follows a logarithmic scale. This voltage is converted into a signal frequency by a voltage-to-frequency converter 14. The signal frequency is counted by the frequency counter 11 and recorded in the register 16 which stores the information, for example, as contact closures on a 10 line code. The stored information is then brought forward to a matrix 17.

Figure 2:
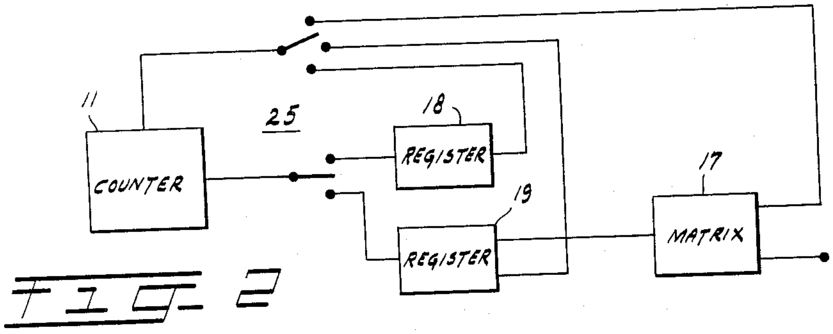
FIG. 2 is a schematic circuit diagram illustrating a counting arrangement for subtraction of successively occurring factors.

The matrix 17 may be employed with two registers 18 and 19, as illustrated in FIG. 2, for addition or subtraction computations. Under these conditions the counter would count one signal frequency and its value would be stored in register 18. Then the counter would count a second signal frequency which is to be added or subtracted and its value would be stored in register 19. Both values are fed successively to the matrix 17 which performs the computation. The matrix 17 is arranged so that both registers 18 and 19 with their contact closures provide a signal path which actuates a device for contact closures or feedback. Suitable switching facilities 25 are available for switching between registers and for feeding back a new time base to the counter 11.

In the instant case, a pulse generating unit 20 provides a constant input which appears as contact closures on the matrix 17 and the matrix 17 thereupon performs an addition or subtraction operation with respect to the first applied signal frequency. The result is fed back to the counter 11 to establish a new time base. Next, the capacity of the wire 10 is measured by a suitable device 21, converted into a D.C. signal and fed through switching means to the voltage-to-frequency converter 14. The frequency counter 11 counts the signal frequency with the new time base from the matrix 17. This value is fed to the register 16 and then to the control system 22 which adjusts the dielectric constant of the insulated wire 10 according to the computed value.

Maintaining constant control on two process variables is necessary in extruding expanded plastic wire because the dielectric constant $E_r$ depends on the degree of expansion. When solid plastic wire is extruded $E_r$ is a constant for a certain temperature. A capacity monitor is employed to take advantage of this relationship and the extruded wire is controlled for capacity. A predetermined capacity C insures the desired diameter of insulation D where the wire diameter $d$ is a constant as can be seen from the formula:

$$C=\frac{7.354E_r}{\log_{10}\frac{D}{d}}\ \text{mmf/foot}$$

In the case of expanded plastic wire, D and C are no longer proportional as they were in the case of solid plastic wire. Controlling one process variable is therefore inadequate and will not give satisfactory results. For example, the measured capacity could be within predetermined limits but the diameter could be off depending on the degree of expansion. A solution is to solve the above formula for $E_r$ continuously.

$$7.354E_r=C(\log D-\log d)$$

Since $d$ is the copper wire diameter it can be considered as a consant K for the same gauge wire and computed. Then, $$7.354E_r=C(\log D-K)$$

Solving this equation continuously and controlling $E_r$ accordingly will produce insulated wire which will meet both the C and D requirements.

As previously described a setting representative of the insulation diameter is fed to the matrix 17. A K setting 20 which is the log $d$ of the wire gauge being run is also fed as contact closures to the matrix 17. The matrix 17 now performs the operation $$\log D-K$$

This information is fed back to the counter 11 as its new time base. Now the capacity of the wire is fed to the counter 11 and counted with the time base of log $D-K$ Since $$N_{\text{Diameter}}(\text{frequency count})=\frac{f_{\text{Diameter}}}{f_{\text{Standard}}}\cdot T_1(\text{time base})$$

In the matrix this becomes:

$$\frac{f_{\text{Diameter}}}{f_{\text{Standark}}}\cdot(T_1-K)$$

which expression is the new time base for the counter and thus $$N_{\text{capacity}}(\text{frequency count})=\frac{f_{\text{capacity}}}{f_{\text{Standard}}}\left(\frac{f_{\text{diameter}}}{f_{\text{Standard}}}\cdot(T_1-K)\right)$$

Thus the operation $$C\ (\log D-K)=7.354E_r$$

This value is brought to the register and from there to the control system 22 which adjusts the $E_r$ of the running wire according to the computed value. Thus, in effect, this system maintains a predetermined dielectric constant to provide a uniformly insulated wire. It is important in the present case to control for $E_r$ since reliance on C might result in unduly varying D and $E_r$ and in a multiple conductor cable such variations could not be tolerated. This system can also be utilized where the wire diameter $d$ is found to vary by measuring said diameter in a manner similar to the insulation diameter and similarly feeding the result to the matrix in place of the K setting.

Figure 3:
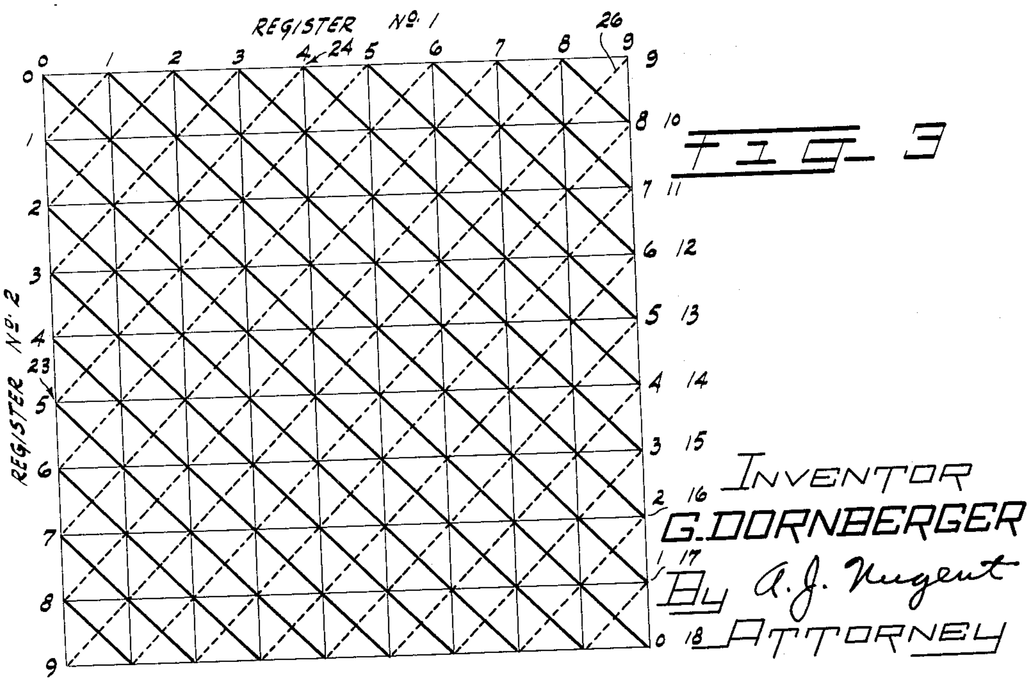
FIG. 3 is a schematic diagram illustrating the matrix arrangement of contact closures.

In FIG. 3 the matrix arrangement is shown as contact closures but is to be understood that numerous electronic and electro-mechanical devices may be employed to perform the same function. In the present set-up a first value is registered as a contact closure in the horizontal row 23, then a second value is brought to the vertical row 24. Proceeding along a diagonal 26 in a direction dependent on whether the values are to be added or subtracted, gives the solution on the top horizontal row. A path is provided for feeding this result back to the counter. The illustrated matrix is designed for one decade and other interconnected matrices would be provided for tens, hundreds and so forth.

It is to be understood, of course, that the counting apparatus includes suitable means for erasing the previous count prior to a new count. Additional components and units may be used to supplement or replace the various illustrated components and units depending among other factors on the calculations involved. The above described arrangements are simply illustrative of the application of the principles of the invention. Numerous other arrangements may be readily devised by those skilled in the art which will embody the principles of the invention and fall within the spirit and scope thereof.

What is claimed is:

1. A computer for making addition or subtraction calculations involving successively occurring signal frequencies comprising a counter, means for applying successive signal frequencies to the counter, a first memory unit operable by said counter for storing a first count, a second memory unit operable by said counter for storing a second count, means for switching between memory units for successive counts, a matrix unit for registering the stored counts and performing the required calculations, and means for feeding back the matrix result to the counter to establish a new time base for performing calculations involving succeeding signal frequencies.

2. A computer for making calculations involving at least two successively occurring signal frequencies comprising a counter, means for applying successive input signals to said counter to make successive counts, a memory coupled to said counter for storing a count related to a first signal frequency, a matrix unit coupled to the memory for receiving the stored count as a first input signal, means for applying a second input signal to the matrix for combination with the stored count input, and means for feeding back a signal representative of the result of the combined inputs from the matrix to the counter to establish a new time base for a successively occurring signal frequency during a succeeding count.

3. In an apparatus for controlling the dimensions of expanded plastic insulated wire by continuously monitoring the dielectric constant of insulation the combination comprising means for making successive voltage measurements of the diameter and capacitance of the insulated wire, means for converting said voltage measurements to successive signal frequencies, a counter connected to the converting means for receiving the successive signal frequencies as inputs, a memory coupled to the counter output and operable by said counter for storing a first count input repersentative of the diameter of the insulated wire, a matrix unit coupled to the memory for receiving the stored count as a first input, means for providing a second input to the matrix representative of the bare wire diameter to be combined with the stored frequency count related to the diameter of the insulated wire to produce a matrix output, and means for feeding back the matrix output to the counter as a new time base for counting the capacitance frequency, the resulting count being representative of the dielectric constant of the insulation.

4. A computer for controlling the insulation of wire by adjusting the dielectric constant of the insulation comprising means for making successive measurements of the continuously varying diameter and capacitance of the insulated wire, means for converting said measurements to successive signal frequencies, a counter connected to the converting means for receiving the successive signal frequencies, a memory connected to and operable by said counter for storing a first count related to the diameter of the insulated wire, a matrix unit coupled to the memory output for registering the stored count as a first input, means for providing a second input to the matrix representative of the bare wire diameter to be subtracted from the stored count, means for feeding back the matrix remainder to the counter as a new time base for counting the second signal frequency related to the capacitance of the insulated wire, the resulting count being representative of the dielectric constant of the insulation, and means coupled to the memory for controlling the application of insulation to the bare wire based on the new count.

5. A computer in accordance with claim 4 wherein the product of the new time base for the capacitance frequency and the capacitance frequency is fed to the memory and including control means responsive to the memory for adjusting the dielectric constant of the insulated wire according to the computer value.

6. A computer for making calculations involving at least two successively occurring signal frequencies comprising:

a counter, means for deriving the successively occurring signal frequencies from measurements of diameter and capacitance on insulated wire, means for applying the successive signal frequencies to said counter to make successive counts, a memory coupled to said counter for storing a count related to a first signal frequency, a matrix unit coupled to the memory for receiving the stored count input, means for applying a second input to the matrix related to the diameter of the bare wire for combination with the stored count input, and means for feeding back the result of the combined inputs from the matrix to the counter to serve as a new time base for a successively occurring signal frequency related to the capacitance of insulated wire during a succeeding count.

7. A computer for making calculations involving at least two successively occurring signal frequencies comprising:

a counter, means for deriving the successively occurring signal frequencies from successive voltage measurements related to the diameter and the capacitance of plastic insulated wire, means for applying the successive signal frequencies to said counter to make successive counts, a memory coupled to said counter for storing a count related to a first signal frequency, a matrix unit coupled to the memory for receiving the stored count input, means for applying a second input to the matrix related to the diameter of the bare wire for combination with the stored count input, and means for feeding back the result of the combined inputs from the matrix to the counter to serve as a new time base for a successively occurring signal frequency during a succeeding count.

8. A computer for making calculations involving at least two successively occurring signal frequencies comprising:

a counter, means for applying successive input signals to said counter to make successive counts, a memory coupled to said counter for storing a count related to a first signal frequency, said memory including a series of relays providing contact closures representative of the stored count, a matrix unit coupled to the memory for receiving the stored count input, means for applying a second input to the matrix for combination with the stored count input, said matrix including a series of contact closures for registering stored counts, and means for feeding back the result of the combined inputs from the matrix to the counter to serve as a new time base for a successively occurring signal frequency during a succeeding count.

References Cited by the Examiner

UNITED STATES PATENTS

| | | | |
|---|---|---|---|
| 2,804,592 | 8/1957 | Biskeborn | 324—61 |
| 2,853,235 | 9/1958 | Brinster et al. | 235—92 |
| 3,012,193 | 12/1961 | Breen | 324—61 |
| 3,015,974 | 1/1962 | Orbom | 80—156 |
| 3,047,800 | 7/1962 | Eigen | 324—54 |

DARYL W. COOK, *Acting Primary Examiner.*

MALCOLM A. MORRISON, *Examiner.*

J. S. TANDIORIO, J. F. MILLER, *Assistant Examiners.*